United States Patent
Zhao et al.

[19]

[11] Patent Number: 5,875,752
[45] Date of Patent: Mar. 2, 1999

[54] ENGINE DRIVE TRAIN HAVING A FRONT GEAR TRAIN WITH IMPROVED TORSIONAL DYNAMICS

[75] Inventors: Alan Zhao; Thomas E. Reinhart; Kwin R. Abram; Mark A. Zen Ruffinen; Paul A. Hayes, all of Columbus, Ind.

[73] Assignee: Cummins Engine Company, Inc., Columbus, Ind.

[21] Appl. No.: 876,535

[22] Filed: Jun. 16, 1997

Related U.S. Application Data

[63] Continuation-in-part of Ser. No. 746,569, Nov. 13, 1996, abandoned.

[51] Int. Cl.$^6$ ............................................. F02B 75/06
[52] U.S. Cl. ........................... 123/192.1; 123/192.2; 123/197.4; 123/197.5; 74/572; 74/574; 74/603; 74/604
[58] Field of Search ............................... 123/192.1, 192.2, 123/197.4, 197.5; 74/572, 574, 603, 604

[56] References Cited

U.S. PATENT DOCUMENTS

| | | | |
|---|---|---|---|
| 1,272,061 | 7/1918 | Lake | 74/574 |
| 1,884,410 | 10/1932 | Vincent | 74/604 |
| 1,928,119 | 9/1933 | Vargha | 74/604 |
| 2,663,198 | 12/1953 | Cairnes | 74/409 |
| 2,880,626 | 4/1959 | Nallinger | 74/604 |
| 2,966,806 | 1/1961 | Luning | 74/409 |
| 3,667,317 | 6/1972 | Hillingrathner | 74/604 |
| 4,194,373 | 3/1980 | Jennings et al. | 464/74 |
| 4,617,884 | 10/1986 | Allen et al. | 123/192.1 |
| 4,629,443 | 12/1986 | Bördner et al. | 464/74 |
| 4,668,116 | 5/1987 | Ito | 403/258 |
| 4,739,670 | 4/1988 | Tomita et al. | 74/409 |
| 4,747,321 | 5/1988 | Hannel | 74/440 |
| 4,802,450 | 2/1989 | Roberts | 123/192.2 |
| 4,820,239 | 4/1989 | Despres et al. | 464/68 |
| 4,882,944 | 11/1989 | Vohl | 74/574 |
| 4,920,828 | 5/1990 | Kameda et al. | 475/299 |
| 5,181,485 | 1/1993 | Hirose et al. | 123/90.17 |
| 5,231,893 | 8/1993 | Sisco et al. | 74/574 |
| 5,269,725 | 12/1993 | Maucher et al. | 464/68 |
| 5,272,937 | 12/1993 | Brosowske et al. | 74/573 R |
| 5,303,681 | 4/1994 | Crofts | 123/192.1 |
| 5,535,643 | 7/1996 | Garza | 74/603 |
| 5,611,416 | 3/1997 | Berger et al. | 192/58.42 |

FOREIGN PATENT DOCUMENTS

| | | | |
|---|---|---|---|
| 2926012 | 10/1980 | Germany | 74/604 |
| WO 92/17694 | 10/1992 | Germany | F02B 75/32 |

*Primary Examiner*—Henry C. Yuen
*Assistant Examiner*—Hai Huynh
*Attorney, Agent, or Firm*—Sixbey, Friedman, Leedom & Ferguson; Charles M. Leedom, Jr.; Tim L. Brackett, Jr.

[57] ABSTRACT

An improved engine gear drive train arrangement is provided which effectively minimizes the crankshaft torsional vibrations at the location of the gear train, for engines with a front gear train. A flywheel is resiliently connected to the rear end portion of the crankshaft so as to resiliently connect a driven unit to the crankshaft. An extra inertial device is connected to the front end portion of the crankshaft and includes an inertia so selected as to cause a nodal point of the first torsional vibration mode of the crankshaft to be located in the vicinity of the crank gear to minimize the amplitude of torsional deflection of the crankshaft at the crank gear. Also, the device for resiliently connecting the flywheel to the rear end portion of the crankshaft may include resilient members positioned in cavities formed by engaging rings. The nodal point of the first torsional mode of the crankshaft is optimally positioned close to the crank gear by selecting an inertia for the rear mounted flywheel, an optimum inertia for the front mounted inertial device and a resilient material for the flywheel connecting device having the appropriate stiffness, so that the combination of these features achieves the desired nodal point positioning for a given engine or application.

20 Claims, 8 Drawing Sheets

FIG. 10

ENGINE DRIVE TRAIN HAVING A FRONT GEAR TRAIN WITH IMPROVED TORSIONAL DYNAMICS This application is a continuation-in-part application of Ser. No. 08/746,569, now abandoned, filed Nov. 13, 1996.

TECHNICAL FIELD

The present invention relates to an engine drive train arrangement including a gear train drive mounted on the front portion of a crankshaft for effectively minimizing the torsional vibrations produced at the location of the gear train.

BACKGROUND OF THE INVENTION

In internal combustion engines, an engine crankshaft is the primary source of torsional load. A crank gear is typically mounted on one end of the crankshaft for driving the engine gear train which includes the cam gear and camshaft among other gear driven elements. Throughout operation of the engine, the torque applied to the crankshaft varies due to, for example, the periodic firing of the engine's cylinders, the engagement and disengagement of driven elements such as a transmission, and the starting, stopping and variations in the speed of rotation of the crankshaft. These torque variations create torsional vibrations which may be transmitted to the gear train of the engine often undesirably causing increased noise, premature engine wear and thus reduced gear life and possibly engine, failure. In addition, since the engine drive gear train is used to drive engine components which are critical to proper engine operation, torsional vibrations transmitted through the gear train may adversely affect engine operation, such as the accuracy of fuel injection timing.

In a conventional engine, a flywheel typically is attached to the rear end of the crankshaft adjacent a coupling/clutch assembly for connection to a driven unit while a damper is attached to the front end of the crankshaft. The flywheel functions to smooth out the power surges generated by the periodic firings in the cylinders thus assisting in minimizing torsional vibrations. Likewise, the damper functions to dampen out or reduce vibrations by dissipating energy. However, while flywheels and dampers achieve some success, torsional vibrations continue to be a significant problem. These torsional vibrations are especially evident in front gear train engines wherein the engine timing gear train is connected to a crank gear mounted on the free end, or front, portion of the crankshaft. For example, the applicant has noted that the inertia associated with the flywheels of prior art couplings tend to cause the node of the first mode of crankshaft torsional vibration to be located in the vicinity of the flywheel, near the rear portion of the crankshaft. The node point corresponds to zero torsional vibration induced motion of the crankshaft of a particular mode. Locating the node near the flywheel has the effect of maximizing the amplitude of the torsional vibration experienced by the front end portion of the crankshaft. Since the timing gear train, and perhaps accessory drives, are typically connected to the front end portion of the crankshaft, the relatively large amplitude of torsional movement of the front end portion of the crankshaft creates undesirable torsional vibrations in the timing gear train. The deleterious effects of torsional vibrations on the gear train are becoming an even greater concern as the demands on the timing gear train, such as higher injection pressure, are increased.

One possible solution to the node positioning problem is to attach the crank gear/timing gear arrangement to the rear end of the crankshaft instead of the front end, i.e. a rear gear train engine. However, a rear gear train mounting arrangement results in various significant drawbacks compared to the front gear train engine. For example, a rear gear train arrangement results in a larger engine incapable of installation in many applications thereby creating complex packaging issues. In addition, accessibility to the engine gear train connection and other engine components is substantially reduced thus increasing the costs and down time associated with engine service, including repair and maintenance.

U.S. Pat. No. 4,617,884 to Allen discloses a torsional vibration isolator device including a flywheel resiliently mounted on the rear end of a crankshaft. The flywheel is thus effectively isolated from the crankshaft to create a natural frequency of torsional vibration of the system to a frequency well below a normal operating range of the engine. However, the assembly results in the node point of zero motion of the crankshaft being located on the rear portion of the crankshaft, an undesirable distance from a front-mounted timing gear train drive.

U.S. Pat. No. 5,303,681 to Crofts discloses a torsional tunable coupling for a diesel engine, including a flywheel connected to a crankshaft which effectively moves the node to the center of the crankshaft. However, the flywheel is rigidly connected to the crankshaft. Also, by using a flywheel having a very low inertia, this arrangement is unlikely to effectively control the rigid body motion of the crankshaft, thus failing to sufficiently prevent undesirable torsional vibration from being transmitted to the driven unit, i.e. transmission.

U.S. Pat. No. 2,880,626 to Nallinger discloses a crankshaft assembly including flywheel inertia mounted on the rear portion of the crankshaft, auxiliary flywheel inertia mounted on the front portion of the crankshaft and an oscillation absorber mounted on the front portion of the crankshaft. The auxiliary flywheel inertia and the oscillation absorber are designed to operate together to reduce the amplitude of torsional vibrations. However, this patent no where suggests shifting the nodal point of first torsional vibration toward a crank gear to minimize the amplitude of torsional vibration at the crank gear. Nallinger does not even appreciate the need to reduce the vibration transferred to the engine gear train. Therefore, Nallinger does not suggest that the inertia of the auxiliary flywheel should be selected to cause the nodal point to be located in the vicinity of the crank gear. In addition, the rear mounted flywheel is rigidly connected to the crankshaft and, therefore, this reference could not suggest selecting a resilient connection having a stiffness capable of optimally positioning the nodal point relative to the crank gear. U.S. Pat. No. 1,884,410 to Vincent discloses a crankshaft assembly including a flywheel rigidly mounted at the rear of the crankshaft. However, the Vincent assembly suffers the same drawbacks of discussed hereinabove with respect to Nallinger.

Another goal of engine designers is to effectively control gear rattle and noise. The gears are designed with looseness or backlash between the gear teeth to permit effective meshing, and prevent binding of the gears. This lash permits the gears to experience backlash and rattling in response to torsional vibrations and other effects, such as load changes, undesirably resulting in excessive gear noise and/or high loads on the gear teeth.

Consequently, there is a need for an engine drive train having a front mounted gear train which is capable of minimizing the torsional deflection experienced at the location of the connection of the gear train to the crankshaft.

SUMMARY OF THE INVENTION

It is an object of the invention, therefore, to overcome the disadvantages of the prior art and to provide an engine drive train assembly capable of effectively and reliably minimizing torsional vibrations transmitted from the crankshaft to the engine gear train.

It is another object of the present invention to provide an engine drive train assembly which minimizes torsional displacement of the crankshaft at the location of a front mounted gear train drive.

It is yet another object of the present invention to provide an engine drive train assembly which positions the nodal point of the first torsional vibration mode adjacent the connection of the gear train drive.

Another object of the present invention is to provide an engine drive train assembly which minimizes both gear train wear and noise.

It is a further object of the present invention to provide an engine drive train assembly which reduces the load on gears in an engine gear train and thus reduces the size and costs of gears.

It is a still further object of the present invention to provide an engine drive train assembly which shifts the nodal point of the first torsional vibration mode of the crankshaft toward a front mounted gear train drive to minimize torsional vibrations transferred to the engine gear train while providing flywheel inertia at the rear end of the crankshaft primarily for optimizing the connection to a driven unit.

Still another object of the present invention is to provide an engine drive train assembly which minimizes transmission of torsional vibrations to an gear train drive while avoiding a rear mounted gear train arrangement.

It is another object of the present invention to provide an engine drive train which includes an engine gear train mounted on the front of an engine crankshaft to form a front timing gear train arrangement while enabling the drive train to behave dynamically similar to a rear gear train mounted arrangement.

It is a further object of the present invention to provide an improved engine drive train which minimizes the torsional displacements in the crankshaft at high speed and/or high load conditions.

Yet another object of the present invention is to provide an improved engine drive train which effectively controls gear rattle in the engine gear train connected to the crank gear thus minimizing gear noise and impact loads.

These and other objects are achieved by providing an engine drive train for driving a driven unit which minimizes torsional vibrations in an internal combustion engine, comprising a crankshaft mounted for rotation and including a front portion and a rear portion, and a crank gear connected to the front portion of the crankshaft for transmitting a drive force to an associated engine gear train. A flywheel is resiliently connected to the rear end portion and connected to the driven unit so as to resiliently connect the driven unit to the crankshaft. A damper assembly may be connected to the first end portion of the crankshaft for damping torsional vibrations transmitted by the crankshaft. An inertial device is connected to the front end portion of the crankshaft and includes an inertia so selected as to cause a nodal point of the first torsional vibration mode of the crankshaft to be located in the vicinity of the crank gear to minimize the amplitude of torsional deflection of the crankshaft at the crank gear. The inertial device may be positioned along the crankshaft between the damper device and the crank gear. The driven unit may be in the form of a clutch and transmission assembly. Also, the engine drive train may include a flywheel connecting device for resiliently connecting the flywheel to the rear end portion of the crankshaft. The flywheel connecting device preferably includes a driving ring connected to the crankshaft, a driven ring connected to the driven unit and resiliently connected to the drive ring, and a resilient device positioned between the driving ring and the driven ring. The flywheel connecting device may further include a plurality of cavities formed between the driving ring and the driven ring and a plurality of resilient elements. Each of the plurality of resilient elements may be positioned in a respective one of the plurality of cavities. The nodal point of the first torsional vibration mode of the crankshaft may be optimally positioned close to the crank gear by selecting an inertia for the rear mounted flywheel, an optimum inertia for the front mounted inertial device and a resilient material for the flywheel connecting device having the appropriate stiffness for resiliency, which achieve the desired nodal point positioning for a given engine or application. The inertia of the flywheel and the inertial device can be adjust in any conventional manner, for example, by adjusting the mass of the flywheel and/or inertial device.

DETAILED DESCRIPTION OF THE INVENTION

Figure 1:
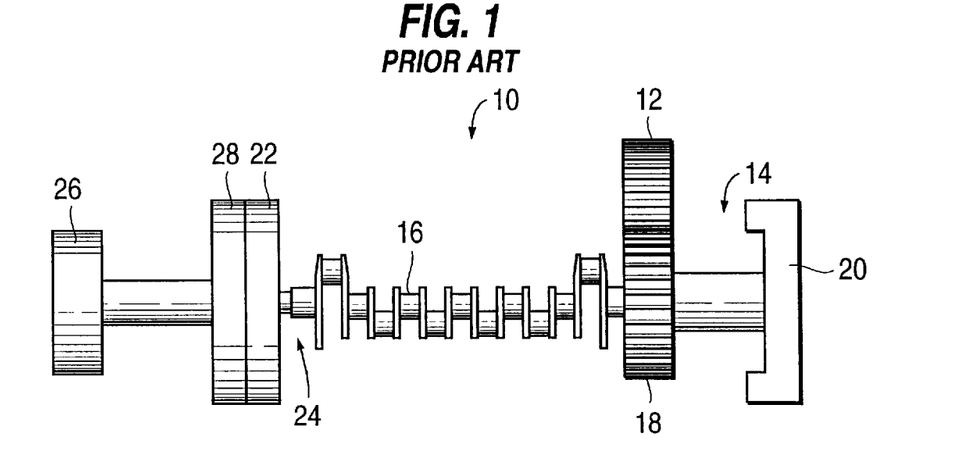
FIG. 1 is a schematic representation of a prior art front gear train engine in which the gear train drive is connected to the front portion of the crankshaft.
Figure 2:
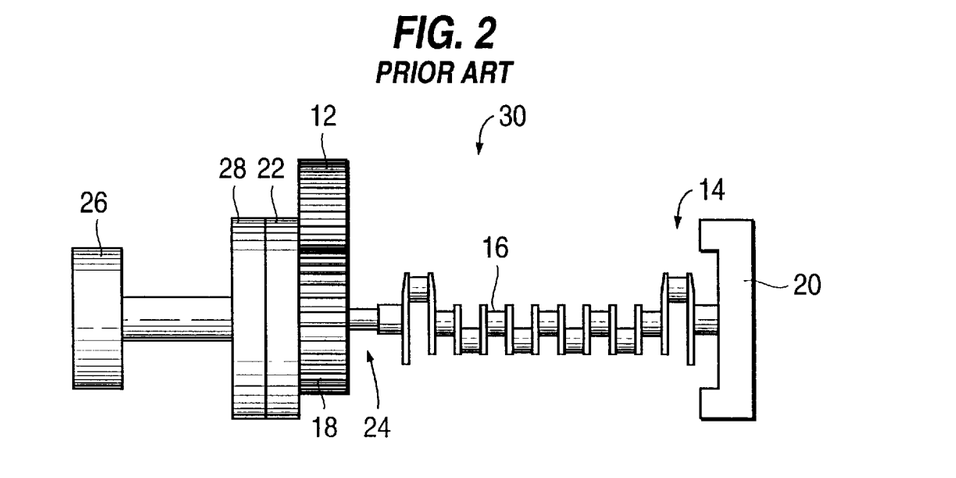
FIG. 2 is a schematic representation of a prior art rear gear train engine in which the gear train drive is connected to the rear portion of the engine crankshaft.
Figure 3:
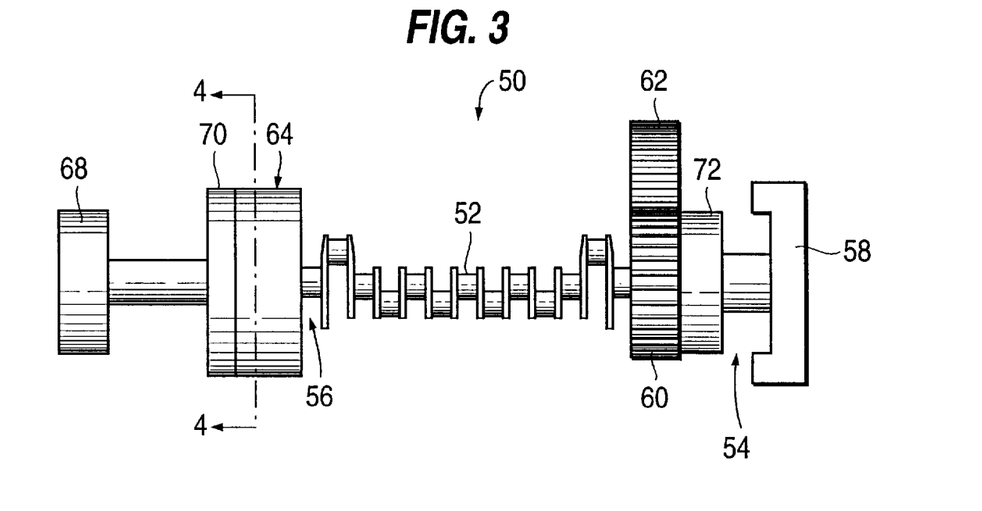
FIG. 3 is a schematic representation of the improved engine drive train of the present invention in which the rear-mounted flywheel is resiliently connected to the rear of the crankshaft and an additional inertia is added to the front portion of the crankshaft.

FIGS. 1, 2 and 3 are provided to illustrate the distinctions of the engine drive train assembly of the present invention over other conventional drive train assemblies. FIG. 1 represents a prior art drive train assembly indicated generally at 10, and hereinafter referred to as a front gear train, so named for the location of the connection of an engine gear train 12 to a front end portion 14 of a crankshaft 16. The front gear drive train 10 also includes a crank gear 18 mounted on front end portion 14 of crankshaft 16 for engaging engine gear train 12 thereby transferring the rotational movement of crankshaft 16 to the engine gear train 12. A damper 20 is also connected to the front end portion 14, for example, at a outer end of front end portion 14, for dampening vibrations transmitted through crankshaft 16. Front gear drive train 10 also includes a conventional flywheel 22 mounted on a rear end portion 24 of crankshaft 16. A driven unit 26, such as a wheel/axle assembly of a vehicle, is operatively connected to rear end portion 24 of crankshaft 16 via, for example, a clutch and transmission assembly 28.

As with most crankshafts used in internal combustion engines, crankshaft 16 is rotated by combustion forces acting on one or more pistons positioned in respective cylinders (not shown). The pistons are connected to crankshaft 16 via a connecting rod and crankpin arrangement (not shown) in a conventional manner. The crankpins are spaced along crankshaft 16 between flywheel 22 and damper 20. The torsional vibrations, induced in the crankshaft by the cyclical variations in the cylinder pressure induced forces imparted on the crankshaft 16 via the connecting rods, are undesirable in many ways. In particular, these torsional vibrations may be transferred to the gear train of the engine undesirably causing increased noise, premature engine wear and thus reduce gear life while also possibly affecting engine operation, such as the accuracy of fuel injection timing. Although flywheel 22 and damper 20 are designed to dampen and minimize the effects of torsional vibrations, these vibrations continue to be a significant problem with respect to the engine gear train 12. The inertia associated with flywheel 22 of conventional front gear drive train 10 tends to cause the node of the first mode of crankshaft torsional vibration to be located in the vicinity of the flywheel 22 at the rear end portion 24 of crankshaft 16. A nodal point is the point along the crankshaft where zero torsional vibration, and thus torsional vibration induced displacement, occurs for a particular mode. As a result, although the torsional vibration is therefore minimized at the rear end portion 24, the amplitude of the torsional vibration is unnecessarily high at the front end portion 14. Consequently, crank gear 18 undergoes an undesirably high degree of torsional displacement and unacceptable torsional vibrations are transmitted to engine gear train 12 resulting in the adverse effects noted hereinabove.

Referring to FIG. 2, a conventional rear gear drive train 30 is shown which is the same as front gear drive train 10 of FIG. 1 except for the location of the connection of the engine gear train to the crankshaft along the longitudinal axis of the crankshaft. In a conventional rear gear drive train 30, crank gear 18 and thus the connection to engine gear train 12, is mounted on the rear end portion 24 of crankshaft 16 adjacent flywheel 22. Thus, the connection to engine gear train 12 is positioned adjacent to the nodal point of the first torsional vibration mode. Consequently, the rear gear drive train 30 of FIG. 2 advantageously minimizes the torsional vibration induced displacement of crank gear 18 and thus minimizes the torsional vibrations transmitted to engine gear train 12. However, rear gear drive train 30 creates various packaging issues making the use of a rear gear drive train costly or impractical for most applications.

Figure 4:
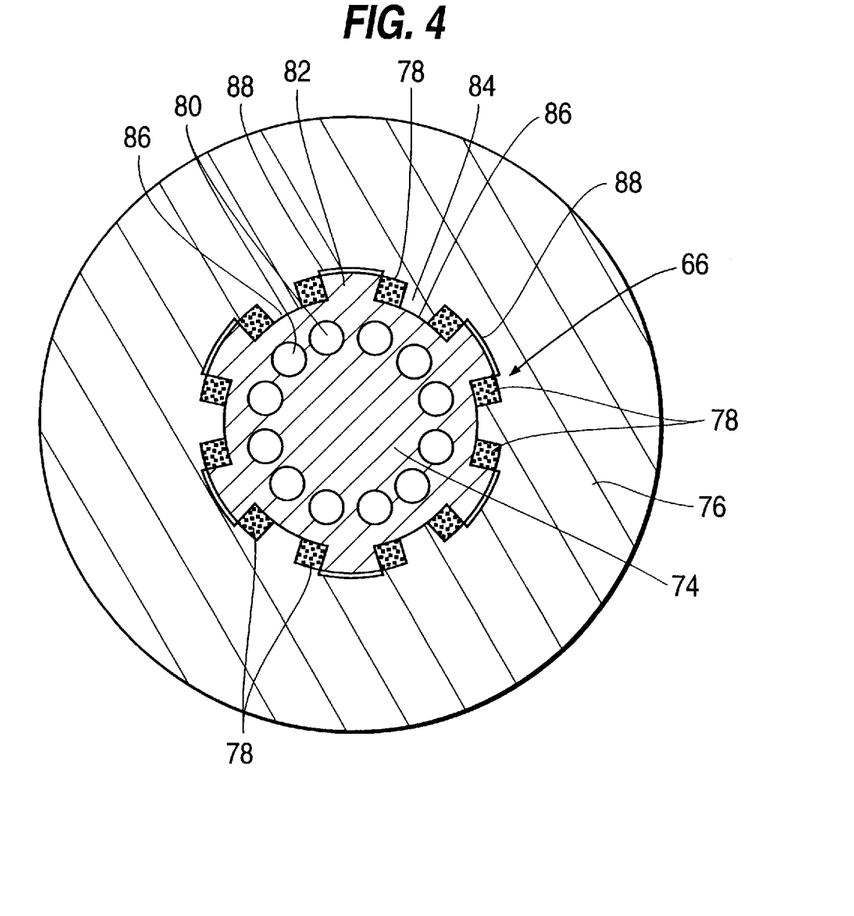
FIG. 4 is a cross sectional end view of the flywheel connection device taken along plane 4—4 of FIG. 3 showing the connection device of the present invention.

Referring to FIGS. 3 and 4, the above noted disadvantages of the prior art drive trains are minimized by the improved engine drive train assembly of the present invention, indicated generally at 50. Improved engine drive train assembly 50 includes an elongated crankshaft 52 extending generally longitudinally to form a front end portion 54 and a rear end portion 56. A conventional damper 58 is mounted on the front end portion 54 of crankshaft 52 for dampening torsional vibrations. In addition, a crank gear 60 is mounted on front end portion 54 in a similar position to that of the front gear drive train 10 of FIG. 1. Crank gear 60 drives an engine gear train, indicated generally at 62, which functions to operate various other engine components in a known manner. Improved engine drive train assembly 50 further includes a flywheel 64 and a resilient flywheel connection device 66 for resiliently connecting flywheel 64 to the rear end portion 56 of crankshaft 52. A driven unit 68 is connected to rear end portion 56 and flywheel 64 via, for example, a clutch and transmission assembly 70. Importantly, improved engine drive train assembly 50 also includes an inertial device 72 mounted on front end portion 54 of crankshaft 52. Inertial device 72 may be formed integrally with damper 58 or as a separate device as shown in FIG. 3. As discussed more fully hereinbelow, flywheel 64, resilient flywheel connection device 66 and inertial device 72 function synergistically to optimally position the node of the first torsional vibration mode close to the position of crank gear 60 along crankshaft 52 so as to minimize the amplitude of torsional deflection at the crank gear thus minimizing the transmission of torsional vibrations to engine gear train 62.

As shown in FIG. 4, resilient flywheel connection device 66 provides a resilient connection between flywheel 64 and crankshaft 52 for absorbing torsional vibrations transmitted from crankshaft 52 and at least partially isolating the inertia of flywheel 64, clutch and transmission assembly 70 and drive unit 68, from crankshaft 52. As shown in FIG. 4, resilient flywheel connection device 66 includes an inner driving ring 74 mounted on the rear end of crankshaft 52, an outer driven ring 76 resiliently mounted on inner driving ring 74 and resilient elements 78 providing the resilient connection between inner driving ring 74 and outer driven ring 76. Outer driven ring 76 is preferably designed with the appropriate inertia so as to function as flywheel 64 for effective connection of the driven unit. Alternatively, a separate flywheel mass may be connected to outer driven ring 76 to form the complete flywheel 64.

Inner driving ring 74 is connected to the end of crankshaft 52 by, for example, mounting bolts (not shown) which extend through respective holes 80 formed in inner driving ring 74. Inner driving ring 74 and outer driven ring 76 include respective projections or teeth 82 and 84, respectively. Radial projections 82 extend outwardly from inner driving ring 74 and are evenly spaced around the circumference to form recesses 86 separating radial projections 82. Likewise, outer driven ring 76 includes radial projections 84 extending inwardly from the inner surface of outer driven ring 76 and spaced evenly around the circumference of outer driven ring so as to correspond to the respective recesses 86. Also, radial projections 84 of outer driven ring 76 form recesses 88 similar to recesses 86 for receiving radial projections 82 of inner driving ring 74. Radial projections 82 and 84 are sized smaller than respective recesses 86, 88 so as to form a cavity in the recesses on both sides of radial projections 82, 84 for receiving resilient elements 78. Resilient elements 78 are generally rectangularly shaped and formed of a resilient elastomer material. Torsional vibrations travelling through crankshaft 52 and inner driving ring 74 are at least partially absorbed by resilient elements 78 during rotation of crankshaft 52.

Improved engine drive train assembly 50 of the present invention advantageously shifts the node of the first torsional vibration mode from a location adjacent rear end portion 56 to a location adjacent crank gear 60 by both isolating flywheel 64 from crankshaft 52 and providing inertial device 72 at the front end portion 54. As a result, engine drive train assembly 50 permits the mounting of engine gear train 62 and crank gear 60 on the front end portion 54 while minimizing the torsional vibrations transmitted to engine gear train 62. The location of the nodal point of the first torsional vibration mode along the longitudinal axis of the front end portion 54 of crankshaft 52 is primarily determined by the stiffness of resilient flywheel connection 66 and the relative magnitudes of the inertia applied to each end of crankshaft 52. With respect to the balancing of the inertias on each end of crankshaft 52, it has been found that by adding inertial device 72 to front end portion 54, given a constant inertia at flywheel 64, the nodal point of the first torsional vibration mode will be moved toward the front end portion 54. Similarly, decreasing the inertia of flywheel 64 relative to inertial device 72 will have the effect of shifting the nodal point along crankshaft 52 toward front end portion 54. The added inertia of device 72 takes over the function of smoothing out the power surges generated by the combustion events in the engine cylinders thereby permitting the decrease in the inertia of flywheel 64. The inertia of flywheel 64 is preferably maintained at a predetermined minimum level necessary to permit flywheel 64 to effectively perform its function of providing an effective connection to the driven unit, for example, by acting as a heat sink for a clutch assembly.

The present invention permits the inertia of flywheel 64 to be maintained at a sufficiently high level to achieve the function of optimizing the connection to the driven unit while decreasing the impact of flywheel 64 on the positioning of the nodal point by utilizing resilient flywheel connection device 66 to at least partially torsionally isolate flywheel 64 from crankshaft 52. The degree of stiffness of elements 78 determines the effectiveness of flywheel connection device 60 in isolating flywheel 64 from crankshaft 52 and, therefore, also effects the positioning of the nodal point of the first torsional vibration mode. By choosing an elastomer material having a lower degree of stiffness, flywheel 64 will be more effectively isolated from crankshaft 52 thereby moving the nodal point toward crank gear 60. Conversely, selecting an elastomer material having a higher degree of stiffness will have the effect of shifting the nodal point toward flywheel 64, assuming all other variables remain constant. Although the elastomer material used to form resilient element 78 must possess enough resiliency to provide the necessary damping or absorbing qualities needed to isolate flywheel 64 from crankshaft 52, the elastomer material must also be rigid or stiff enough to effectively transmit torque to drive unit 68 so as to provide predictable and reliable operation of the drive unit. Also, the resilient flywheel connection device 66 may be designed with sufficient resiliency to permit the conventional clutch spring of the clutch assembly to be omitted. Therefore, the elastomer material used to form resilient elements 78 may be selected to achieve a predetermined stiffness, or isolation capability, corresponding to the desired effect on the location of the nodal point. In this manner, resilient flywheel connection device 66 can be tuned, or designed, to achieve the desired effect on the location of the nodal point. Of course, in order to achieve the optimum position of the nodal point closest to crank gear 60 at the front end portion 54 of crankshaft 52, the relative inertia of flywheel 64 and inertial device 72 must also be considered for a particular engine. Thus, the inertia of flywheel 64, the inertia of inertial device 72 and the stiffness of resilient element 78 may each be adjusted independently, or in combination, to position the nodal point at an optimum location as close as possible to crank gear 60. As with any iterative evaluation or calculation, the relative inertial values and stiffness of connection device 66 can be repeatedly adjusted and the results analyzed until the inertial combination and stiffness value, which position the nodal point closest to crank gear 60, is achieved.

Figure 5:
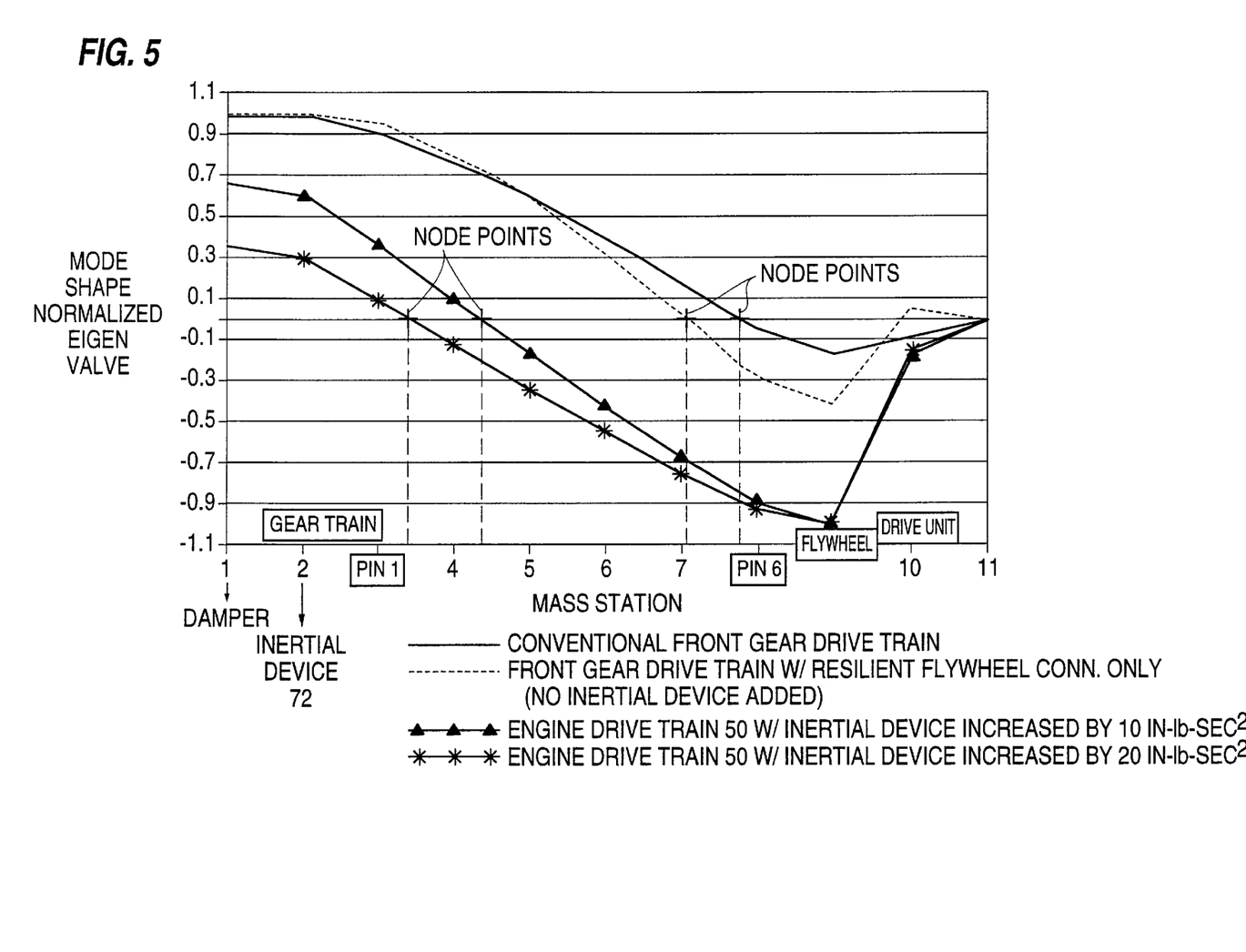
FIG. 5 is a graph showing a comparison of the nodes of the first mode of crankshaft torsional vibration of the engine drive train of the present invention having a resiliently mounted, isolated flywheel and added front inertia, to conventional engine drive trains having rigidly connected, rear mounted flywheels and no extra front mounted inertia.

FIG. 5 illustrates a comparison of the torsional vibration energy along a crankshaft of a conventional front gear drive train with two versions of the engine drive train assembly 50 of the present invention having inertial devices 72 with different inertias. FIG. 5 also illustrates the torsional vibration energy shape for an engine drive train including the resilient flywheel connection device 66 but without the added inertial device 72. As shown in FIG. 5, the conventional front gear drive train results in a nodal point of the first torsional vibration mode positioned close to the rear mounted flywheel. The addition of resilient flywheel connection device 66 only, results in a modest shift in the nodal point toward the front end portion of the crankshaft. However, the addition of inertial device 72 in combination with resilient flywheel connection device 66 shifts the nodal point a substantial distance along crankshaft 52 to a position close to the connection of crank gear 60 and engine gear train 62. Thus, the combination of resilient flywheel connection device 66 and inertial device 72 synergistically functions to shift the location of the nodal point of the first torsional vibration mode to an optimal position close to the connection of engine gear train 62.

Figure 6:
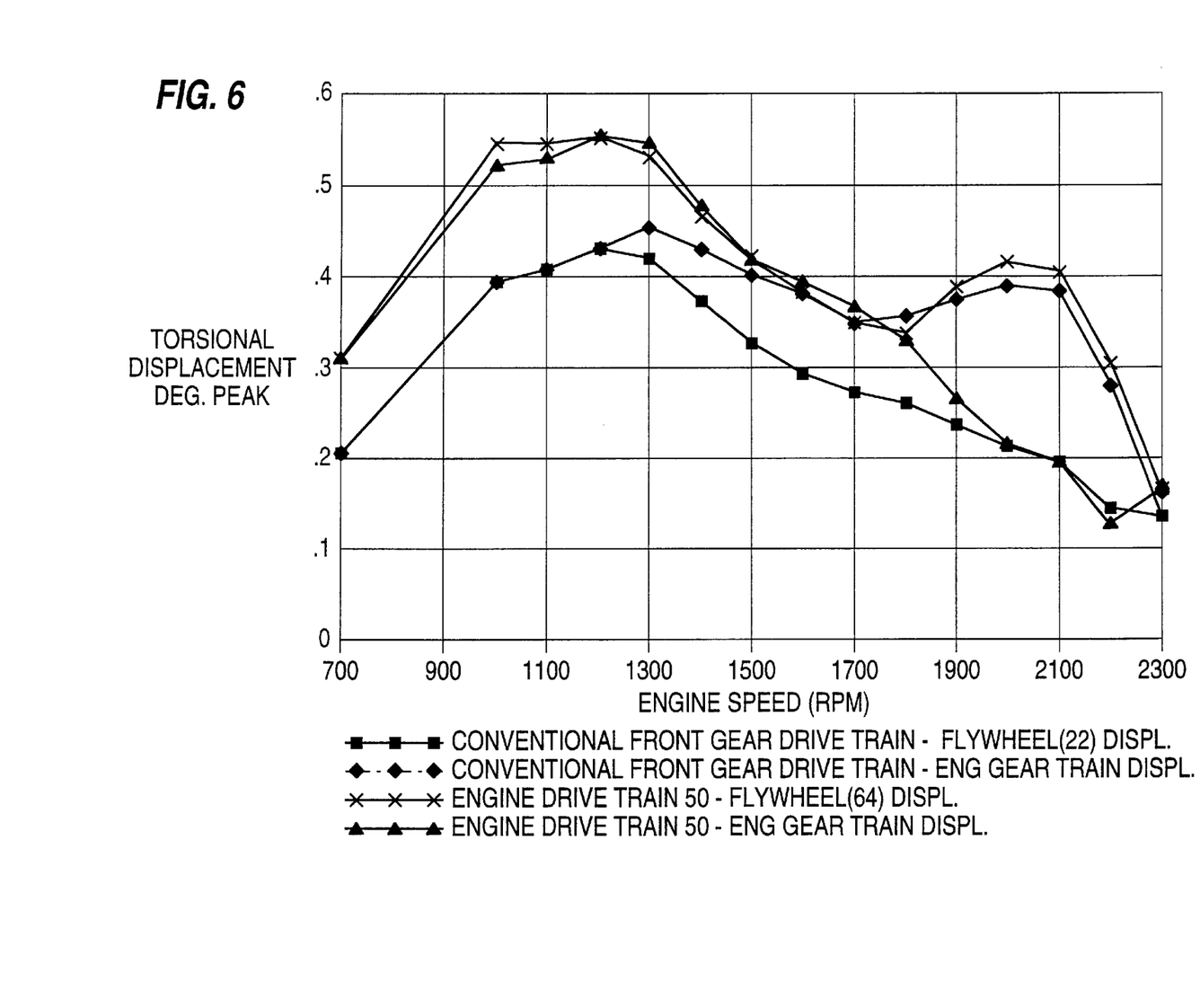
FIG. 6 is a graph showing the advantage of the present engine drive train in decreasing torsional displacement experienced by the gear train drive connected to the front portion of the crankshaft at high speed/high load conditions.
Figure 7:
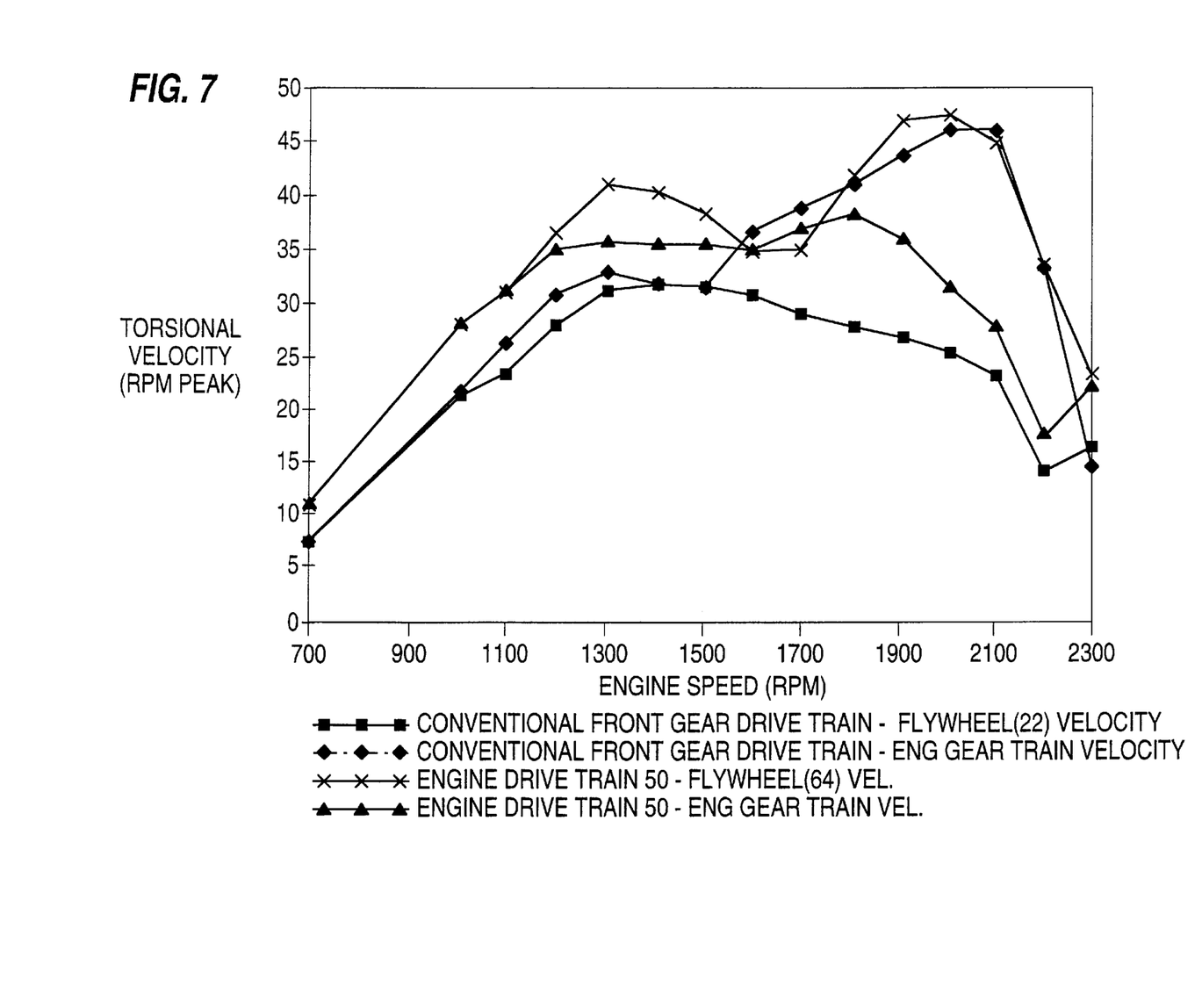
FIG. 7 is a graph showing the torsional velocity reduction capability of the present engine drive train at high engine speed.

The present engine drive train assembly 50 is particularly advantageous when the engine is operating at high speeds and/or high loads. Therefore, engine drive train assembly 50 is particularly advantageous for those engines used in applications which require operation under high speed and/or high loads for extended periods of time, or in applications in which the most detrimental effects of torsional vibrations occur at high speeds or high loads. As shown in FIG. 6, for a given engine incorporating in the engine drive train assembly 50, the torsional displacement advantages of the present invention are experienced at speeds greater than approximately 1750 rpm wherein the torsional displacement of the front-mounted engine gear train 62 decreases significantly relative to the torsional displacement experienced by the engine gear train 12 of the conventional front gear drive train 10. Although the improved engine drive train assembly 50 of the present invention may increase the torsional displacement at the flywheel mounted on the rear end portion of the crankshaft at high speed/high load conditions, the benefits realized in minimizing the torsional displacement and vibrations experienced by the engine drive train 62 greatly outweigh any negative effect experienced at the rear end portion of the crankshaft. In addition, the increased displacement at the rear mounted flywheel 64, will be absorbed by the resilient elements 78 and should not adversely affect engine operation and performance. Likewise, as shown in FIG. 7, the torsional velocity experienced by the engine gear train 62, in the engine drive train assembly 50 of the present invention, decreases significantly at high engine speeds relative to the increasing torsional velocity experienced by engine gear train 12 of conventional front gear drive train 10. Consequently, as shown in FIGS. 6 and 7, the engine drive train assembly 50 of the present invention effectively decreases the torsional displacement and torsional velocity experienced by a front-mounted engine gear train at high speeds/high load conditions through the use of resilient flywheel connection device 66, inertial device 72 and the relative inertia on both ends of crankshaft 52.

It should be noted that the resilient flywheel connection device 66 of the present invention could be formed from other resilient devices such as Bellville washers, leaf springs, coil springs or any other combination thereof as long as the particular device is specifically designed to function in the manner described hereinabove. For example, the resilient elements 78 could function to achieve linear spring characteristics or nonlinear spring characteristics. With respect to the nonlinear spring design, resilient element 78 could be formed of elastomer blocks sized relative to their respective recesses so as to permit increased deflection in proportion to an increased load or torque until a predetermined level of torque corresponding to a maximum desired amount of deflection is achieved, where upon the resilient elements would fill the respective recesses to prevent any further significant deflection. Such a nonlinear spring arrangement is disclosed in U.S. patent application Ser. No. 662,319 filed Jun. 13, 1996 and entitled Crankshaft Gear Torsional Vibration Isolator Assembly for an Engine, which is hereby incorporated by reference.

Figure 8:
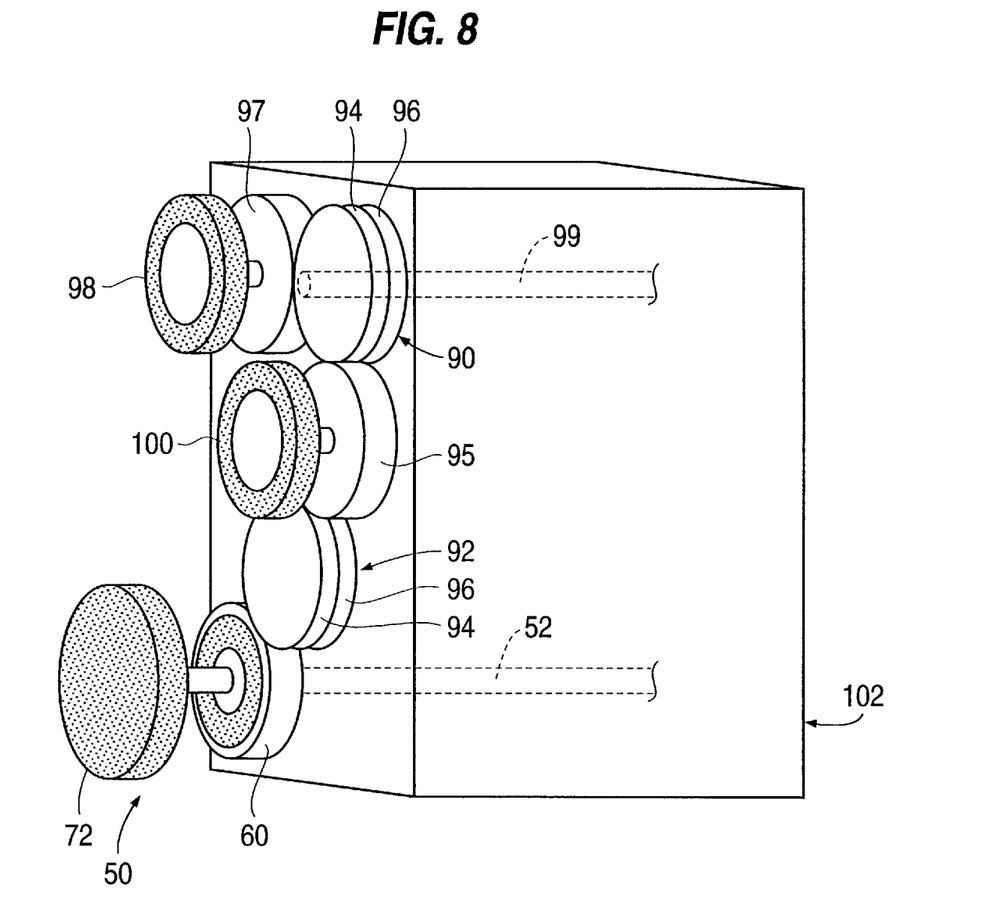
FIG. 8 is schematic of an engine including the present engine drive train of the present invention in combination with an engine timing gear train having lash control devices.

Referring now to FIG. 8, the improved engine drive train 50 of the present invention can be combined with one or more lash control devices 90, 92 positioned along the engine timing gear train serving an engine 102 to effectively control gear train noise at low load/low speed conditions. At low speed/low load conditions, the crankshaft's rigid body motion, resulting from torsional vibrations induced by engine cylinder firings, causes the gears in the engine drive train to move relative to one another, i.e. backlash, resulting in a rattling noise and impact loads on the gear teeth. Lash control devices 90, 92 may be any conventional lash control gear arrangement, such as scissor gears, wherein two half gears 94, 96 are coaxially mounted and circumferentially spring-loaded creating a biasing or preloading effect in order to remove lash in the mesh between the gears. Lash control device 90 is positioned in meshing relationship between crank gear 60 and an intermediary gear 95 while lash control device 92 is positioned in meshing relationship between intermediary gear 95 and a cam gear 97 mounted on a camshaft 99 positioned to drive engine components, such as valves and injectors, in timed relationship relative to the rotation of crankshaft 52.

Figure 9:
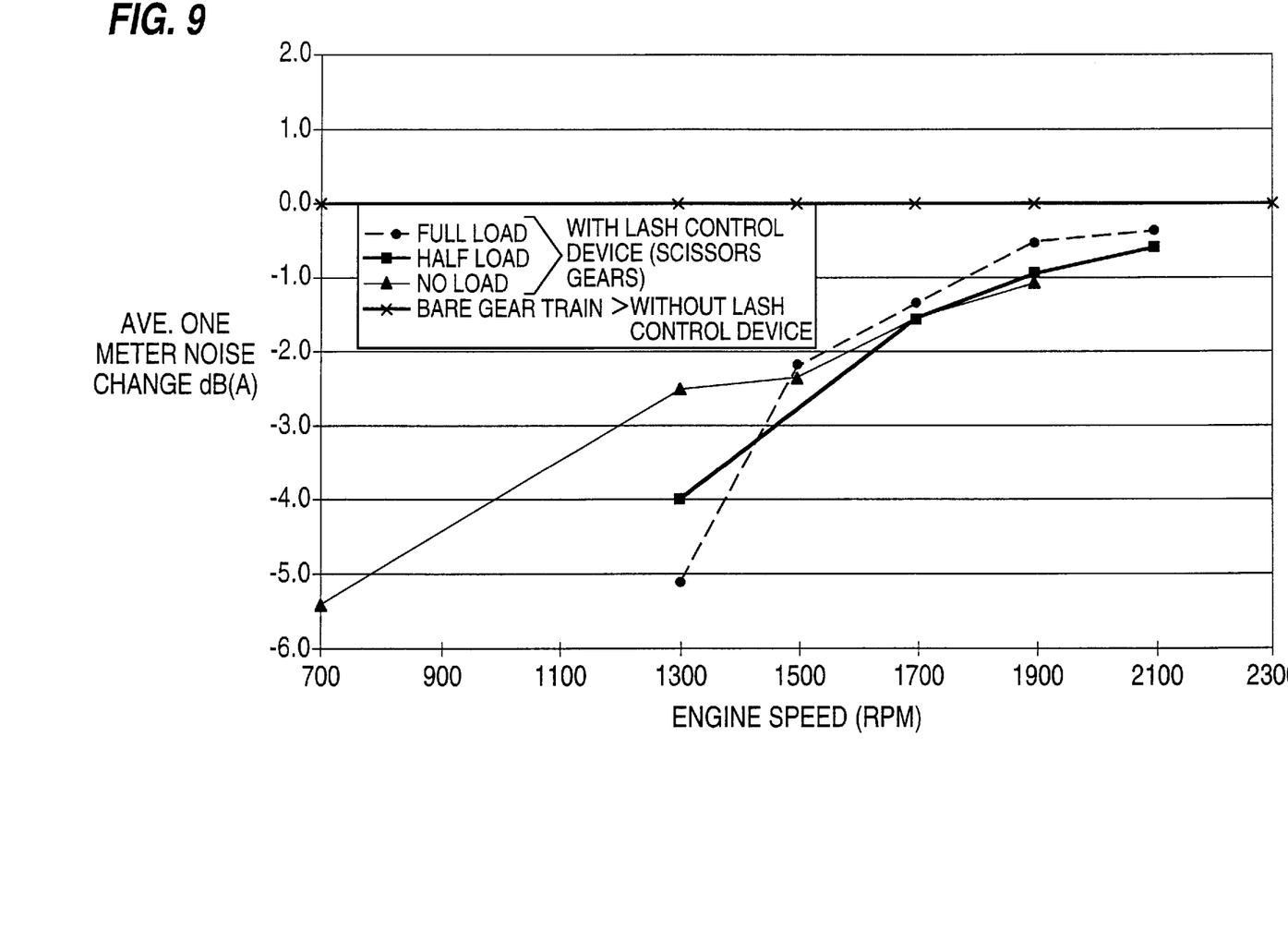
FIG. 9 is a graph showing the engine noise reduction at various engine loads due to scissors gears (lash control device) as compared to a bare engine having no lash control device.
Figure 10:
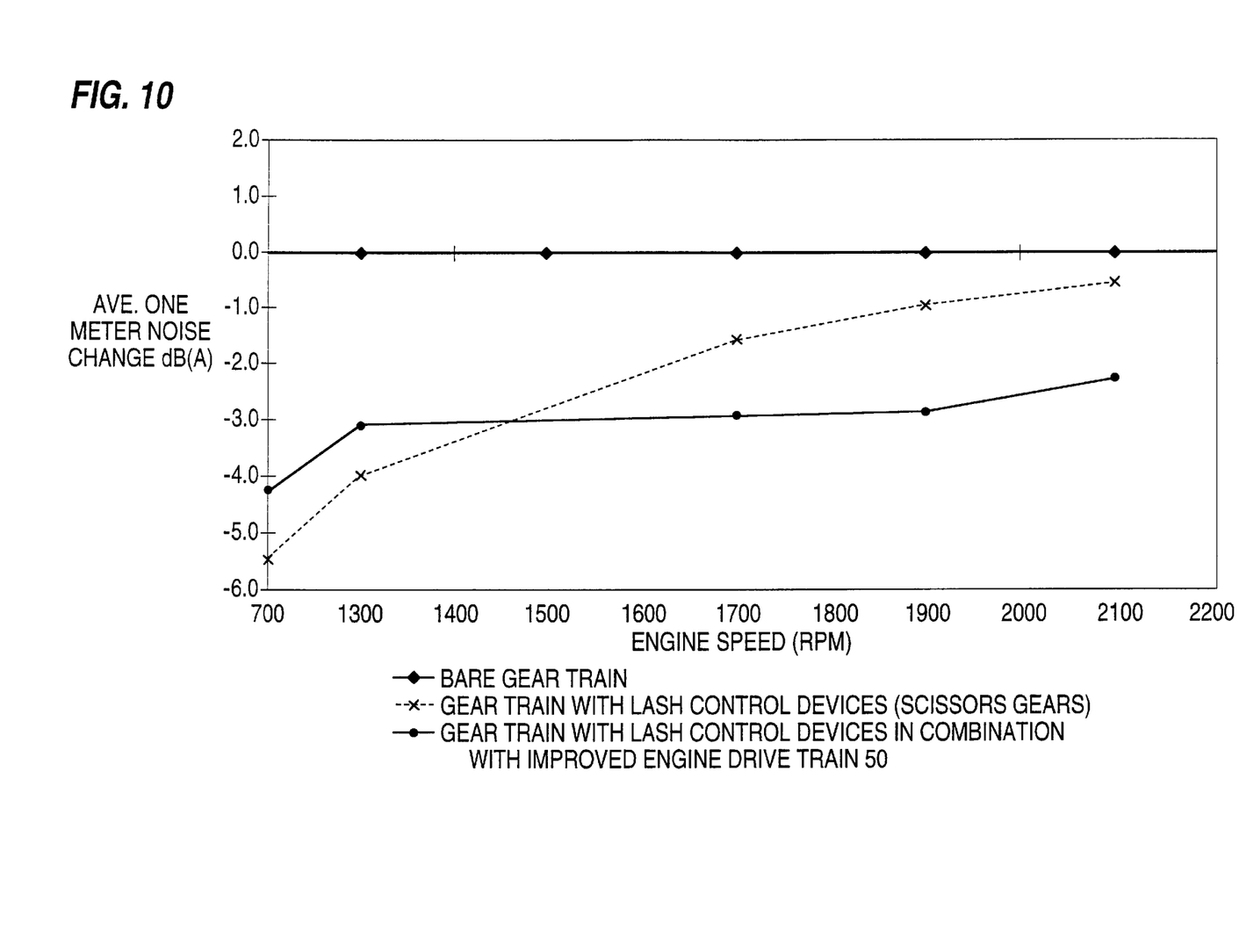
FIG. 10 is a graph showing the engine noise reduction in an engine gear train having only scissors, and an engine gear train with both scissors and the present engine drive train assembly.

By positioning on the lash control devices 90, 92 in the timing gear train as shown in FIG. 8, lash can be removed in the entire timing gear train. The improved engine drive train 50 of the present invention, including the flywheel 64 (FIG. 3), resilient flywheel connection device 66 (FIG. 3) and inertial device 72, in combination with the lash control devices 90, 92 function synergistically to optimally minimize gear noise. As shown in FIG. 9, lash control devices 90, 92 result in a significant reduction in engine noise at all load conditions, and especially at low engine speeds, compared to a bare timing gear train without any lash control. The reduction in engine noise is substantial at high engine speed. More importantly, when the lash control devices 90, 92 are combined with the engine drive train 50 of the present invention, optimum noise reduction is achieved at both high and low engine speeds as shown in FIG. 10. Also, by reducing the magnitude of the torsional vibrations transferred from the crankshaft to the timing gear train, the engine drive train 50 of the present invention advantageously reduces the torque, or preload, required in the lash control devices, thereby increasing the reliability and durability of the lash control devices. The timing gear train may also be provided with torsional vibration damper 98, 100 for damping the torsional vibrations in the timing gear train to provide further reductions in gear noise.

INDUSTRIAL APPLICABILITY

The engine drive train assembly of the present invention may be used on any engine having a crankshaft and a crank gear for driving an engine gear train associated with any vehicle or industrial equipment where effective minimization of torsional vibration and displacement at the engine gear train is desired.

We claim:

1. An engine drive train for driving a driven unit which minimizes torsional vibrations in an internal combustion engine, comprising:

a crankshaft mounted for rotation, said crankshaft including a front end portion and a rear end portion;

a crank gear connected to said front portion of said crankshaft for transmitting a drive force to an associated engine gear train;

a flywheel resiliently connected to said rear end portion and connected to the driven unit so as to resiliently connect the driven unit to said crankshaft; and a front inertial means connected to said front end portion of said crankshaft and having an inertia so selected as to cause a nodal point of a first torsional vibration mode of said crankshaft to be located in the vicinity of said crank gear to minimize the amplitude of torsional deflection at said crank gear.

2. The engine drive train of claim 1, further including a clutch and transmission assembly connecting said driven unit to said crankshaft via said flywheel.

3. The engine drive train of claim 1, further including a flywheel connecting means for resiliently connecting said flywheel to the rear end portion, said flywheel connecting means including a driving ring connected to the crankshaft, a driven ring connected to said driven unit and resiliently connected to said drive ring, and a resilient means positioned between said driving ring and said driven ring.

4. The engine drive train of claim 3, wherein said flywheel connecting means further includes a plurality of cavities formed between said driving ring and said driven ring and a plurality of resilient elements, each of said plurality of resilient elements positioned in a respective one of said plurality of cavities.

5. The engine drive train of claim 3, wherein the flywheel and the driven unit form an application inertia, wherein the inertia of the front inertial means is selected relative to said application inertia, and a stiffness of said resilient means is selected, so as to optimally position the nodal point in the vicinity of said crank gear.

6. The engine drive train of claim 1, further including a damping means connected to said front end portion of said crankshaft for damping torsional vibrations transmitted by said crankshaft.

7. The engine drive train of claim 6, wherein said front inertial means is positioned along said crankshaft between said damping means and said crank gear.

8. The engine drive train of claim 1, wherein the engine gear train driven by said crank gear includes a camshaft for operating engine components in timed relationship to the rotation of said crankshaft, a cam gear mounted on said camshaft and an intermediary gear for transferring the drive force from said crank gear to said cam gear, further including a lash control means positioned along the engine gear train for minimizing lash between said intermediary gear and said crank and cam gears.

9. The engine drive train of claim 8, wherein said lash control means includes a first set of scissors gears positioned in meshing relationship between said crank gear and said intermediary gear and a second set of scissors gears positioned in meshing relationship between said intermediary gear and said cam gear.

10. An engine drive train for minimizing torsional vibrations in an internal combustion engine, comprising:

a rotatably mounted crankshaft including a first end and a second end;

a crank gear connected to said crankshaft adjacent said first end for transmitting a drive force to an associated gear train;

a first inertial means resiliently connected to said crankshaft adjacent said second end for optimizing connection to a driven unit, said first inertial means including a flywheel and a flywheel connecting means for resiliently connecting said flywheel to said crankshaft; and a second inertial means connected to said crankshaft adjacent said first end and having an inertia so selected as to cause a nodal point of a first torsional vibration mode of said crankshaft to be located in the vicinity of said crank gear to minimize the amplitude of torsional deflection at said crank gear.

11. The engine drive train of claim 10, further including a damper connected to said first end of said crankshaft for damping torsional vibrations transmitted by said crankshaft.

12. The engine drive train of claim 10, wherein said inertial means is positioned along said crankshaft between said damping means and said crank gear.

13. The engine drive train of claim 10, further including a clutch and transmission assembly connected to said flywheel.

14. The engine drive train of claim 10, wherein said flywheel connecting means includes a driving ring connected to the crankshaft, a driven ring connected to said driven unit and resiliently connected to said drive ring, and a resilient means positioned between said driving ring and said driven ring.

15. The engine drive train of claim 14, wherein said flywheel connecting means further includes a plurality of cavities formed between said driving ring and said driven ring and a plurality of resilient elements, each of said plurality of resilient elements positioned in a respective one of said plurality of cavities.

16. The engine drive train of claim 10, wherein said first inertial means forms an application inertia, wherein the inertia of said second inertial means is selected relative to said application inertia, and a stiffness of said flywheel connecting means is selected, so as to optimally position the nodal point in the vicinity of said crank gear.

17. The engine drive train of claim 10, wherein the engine gear train driven by said crank gear includes a camshaft for operating engine components in timed relationship to the rotation of said crankshaft, a cam gear mounted on said camshaft and an intermediary gear for transferring the drive force from said crank gear to said cam gear, further including a lash control means positioned along the engine gear train for minimizing the lash between said intermediary gear and said crank and cam gears.

18. The engine drive train of claim 17, wherein said lash control means includes a first set of scissors gears positioned in meshing relationship between said crank gear and said intermediary gear and a second set of scissors gears positioned in meshing relationship between said intermediary gear and said cam gear.

19. A method of reducing torsional vibration induced displacement at a front portion of a rotating crankshaft of an internal combustion engine, comprising the steps of:

providing a first inertia connected to a rear portion of the crankshaft;

providing a first inertia connecting means for resiliently connecting said first inertia to the crankshaft;

providing a second inertia connected to the front portion of the crankshaft, said second inertia having an inertia so selected as to cause a nodal point of a first torsional vibration mode of the crankshaft to be located in the vicinity of the front portion of the crankshaft to minimize the amplitude of torsional deflection of the front portion;

adjusting the inertia of at least one of said first inertia and said second inertia such that the nodal point of the first torsional vibration mode of the crankshaft is positioned along the front portion of the crankshaft to further minimize the amplitude of torsional deflection at the front portion.

20. The method of claim 19, wherein said first inertia connecting means includes at least one resilient means, the method further comprising the step of selecting said at least one resilient means with a stiffness level which positions the nodal point of the first torsional vibration mode along the front portion of the crankshaft.

* * * * *